United States Patent [19]

Pohle

[11] 4,239,392

[45] Dec. 16, 1980

[54] GRATING OUTPUT WAVEFRONT SAMPLING SYSTEM

[75] Inventor: Richard H. Pohle, Monta Vista, Calif.

[73] Assignee: The United States of America as represented by the Secretary of the Air Force, Washington, D.C.

[21] Appl. No.: 922,602

[22] Filed: Jul. 7, 1978

[51] Int. Cl.$^2$ .............................. G01B 9/02; G02B 5/18
[52] U.S. Cl. .................................. 356/354; 350/162 R
[58] Field of Search ......................................... 356/354

[56] References Cited

U.S. PATENT DOCUMENTS

| 3,090,279 | 5/1963 | Chisholm | 356/354 |
| 3,603,690 | 9/1971 | Hard | 356/354 |

OTHER PUBLICATIONS

Erikson, K. E., "Fabrication and Evaluation of a Weak Zone Plate for Monitoring Performance of Large Orbiting Telescopes", NASA CR112080, N7230891, Jul. 1972.
Erikson, K. E., "Investigation Monitoring and Control of Large Telescope Performances", NASA CR118, N7119019, Sep. 1970.
Harris, J. S., "Diffraction Grating Beam Sampling Technology", AFWL-TR-72140, AD762306, May 1973.
Harris, J. S., "Diffraction Grating Development", AFWL-TR-74218, ADA008199, Jul. 1974.
"Laser Wavefront Analyzer Using Frequency Offset Interferometry", Report AFWL-TR-74-26, AD922980, Jul. 1974.

Primary Examiner—John K. Corbin
Assistant Examiner—Scott J. Sugarman
Attorney, Agent, or Firm—Donald J. Singer; Jacob N. Erlich

[57] ABSTRACT

A grating output wavefront sampling system having a plurality of weak gratings located on the last mirror of a beam expander utilized in conjunction with a quasi-monochromatic light source. The gratings diffract a portion of the projected beam of light to a plurality of wavefront sensors, one sensor being utilized for each grating. Knowledge of the direction of the diffracted beams obtained from the wavefront sensors give information about the direction of the projected beam by virtue of conventional grating equations and Hartmann-subaperture tilt analysis. Consequently, if the wavelength and grating spacing are known, tilt and wavefront accuracy of the projected ray or beam are readily attainable.

10 Claims, 3 Drawing Figures

GRATING OUTPUT WAVEFRONT SAMPLING SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates generally to laser beam projectors or telescopes, and, more particularly, to a wavefront sampling system which utilizes a diffraction grating on the primary mirror of the beam projector in order to insure high accuracy in the projected beam.

Laser beams have a number of remarkable properties. Because of their spatial coherence, they have an extremely small divergence and are therefore highly directional. A laser beam because it possesses space coherence, can be focused to form a spot whose diameter is of the order of one wavelength of the laser light itself. Enormous power densities are thus obtainable. Accordingly, system applications of lasers are useful for communication in space, on earth and undersea, as well as in survelliance and weapon systems.

In many laser systems it is desirable to concentrate the projected laser energy into a small area in the object plane. In order to accomplish this end, large optics in the projector system are required. To achieve the high performance theoretically possible with such large optics, other parts of the projection system must also perform at comparable levels of high accuracy. For example, at diameters of 4.3 meters with $\lambda = 2.7\mu$, the radius of the Airy disc is only 0.77 R. To deposit energy upon a given target area at $\frac{3}{4}$ of the ideal rate, the boresight error can be only about 0.2 $\mu$R even assuming a perfect projected beam. On the other hand, if we assume a perfect boresight, the projected wavefront error allowable to achieve the $\frac{3}{4}$ maximum deposition rate is only $\lambda/13$ rms.

To assure this high accuracy in the projected beam, a wavefront sampling system should incorporate therein the following characteristics:

1. It should have a negligible insertion loss;
2. It should provide a signal to the wavefront sensors which is sufficiently and uniformly attenuated;
3. It should sample over the entire aperture;
4. It should give a measurement of the projected wavefront phase accuracy after the wavefront has left the last optical surface;
5. It should be independent of those factors which do not affect energy density on the target (that is, laser wavelength changes, etc.);
6. It should measure net projected wavefront tilt (boresight) as well as relative wavefront inaccuracies; and
7. The wavefront analysis method should be capable of sufficient accuracy and signal to noise for general application.

The wavefront sampling systems which have been used in the past utilized therein either beamsplitters, corner cubes, or target return signals. Unfortunately, these systems have serious drawbacks for large aperture high energy wavefront sampling systems. For example, the beamsplitter samples from a distorting surface and does not measure the final projected wavefront. The corner cubes waste energy, sample over small aperture areas and suffer from diffraction effects. The use of the target return from distant targets suffers from a lack of high frequency response due to the light transit time, difficulty in using extended targets and signal to noise problems caused by a low target return and competition from the projector radiation. It is therefore clearly evident that there exists a need for a reliable wavefront sampling system which eliminates the drawbacks of sampling systems now in use and set forth hereinabove.

SUMMARY OF THE INVENTION

The grating output wavefront sampling system of this invention overcomes the problems set forth hereinabove by measuring the output ray tilt relative to the primary mirror over the projector output aperture with high accuracy and signal to noise. Where atmospheric distortion is negligible and low frequency boresight drifts of the primary mirror relative to the target may be independently measured, the sampling system of the instant invention is extremely useful. In addition, the system of this invention can monitor the high frequency "jitter" and the various figure errors such as focus and coma. It can provide highly accurate tilt and figure error signals to actuators to correct the wavefront if desired. Furthermore, requirements to vary the boresight or focus, etc. are also easily incorporated into the sampling system of the instant invention. The system of this invention can also be readily incorporated within the 4.3 m cassegrain beam projector system.

The grating output wavefront sampling system of this invention utilizes a quasi-monochromatic beam of light such as from a laser in conjunction with a beam expander. The beam expander is made up of a primary and a secondary mirror as well as at least one sensor or detector. In addition, a plurality of relatively small, closely spaced reflective holographic phase gratings are placed on the primary mirror surface.

During the operation of the system of this invention, the zeroeth order grating output is the projected high energy beam and since, in this order, the usual laws of reflection apply, the output from the grating is a nominally collimated beam along the optic axis. The first order output of each grating is a portion of the output wave tilted and focused onto individual centroid detectors or sensors through a hole located in the center of the secondary mirror. The centroid detectors determine the diffracted ray direction and using, for example, a conventional Hartmann-subaperture tilt analysis can infer figure errors and boresight tilt relative to an arbitrary axis referenced to the primary mirror.

It is therefore an object of this invention to provide a grating output wavefront sampling system which is capable of measuring the output ray tilt relative to the primary mirror with high accuracy and signal to noise.

It is a further object of this invention to provide a grating output wavefront sampling system which can monitor the high frequency "jitter" and the various figure errors such as focus and coma.

It is still a further object of this invention to provide a grating output wavefront sampling system which can provide highly accurate tilt and figure error signals to actuators to correct the wavefront.

It is still a further object of this invention to provide a grating output wavefront sampling system which provides a signal to the wavefront sensors which is sufficiently and uniformly attenuated.

It is still another object of this invention to provide a grating output wavefront sampling system which is economical to produce and which utilizes conventional, currently available components that lend themselves to standard mass producing manufacturing techniques.

For a better understanding of the present invention together with other and further objects thereof reference is made to the following description taken in conjunction with the accompanying drawing and its scope will be pointed out in the appended claims.

DETAILED DESCRIPTION OF THE DRAWING

DETAILED DESCRIPTION OF THE PREFERRED EMBODIMENT

Figure 1:
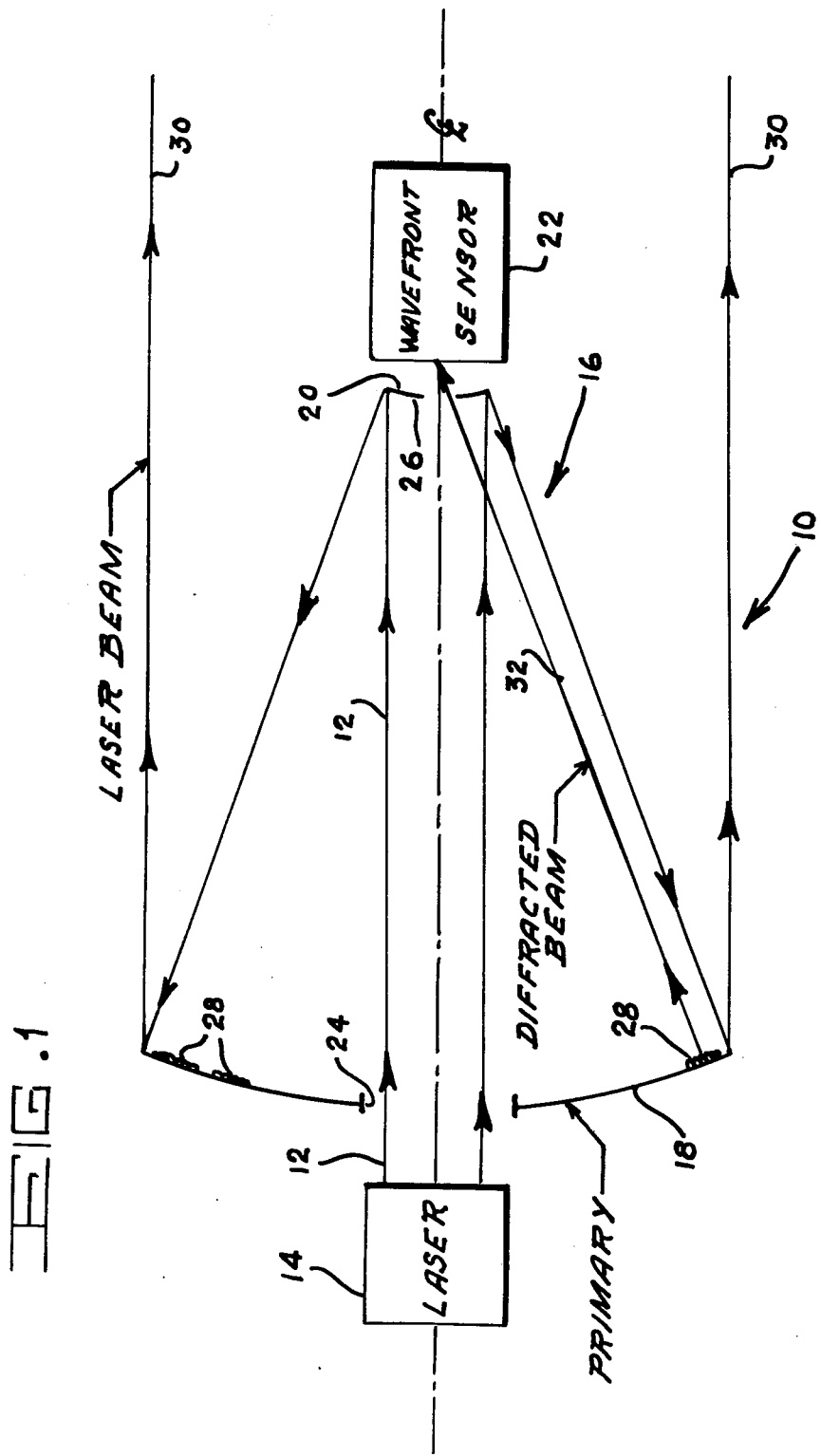
FIG. 1 is a schematic representation of the grating output wavefront sampling system of this invention.

Reference is now made to FIG. 1 of the drawing which illustrates in schematic fashion the Grating Output Wavefront Sampling System 10 of this invention. System 10 is made up of a means for providing a quasi-monochromatic beam of light 12. This means is generally in the form of any conventional laser source 14. Located adjacent to and in optical alignment with laser beam 12 of laser 14 is a projector or beam expander 16.

Beam expander 16 has three basic components, a primary reflective surface or concave mirror 18, a secondary reflective surface or convex mirror 20 and at least one wavefront sensor 22 which may take the form of a plurality of conventional centroid detectors. Each mirror 18 and 20, of beam expander 16 shown in FIG. 1 of the drawing has a centrally located aperture 24 and 26, respectively, therein. Aperture 24 in primary mirror 18 is optically aligned with laser beam 12 and allows beam 12 to pass therethrough while aperture 26 in secondary mirror 20 allows entrance of a portion of beams 32 into sensor 22 in a manner to be set forth in detail hereinbelow. It should, however, be noted that although mirrors 18 and 20 are shown with apertures therein, any other optical arrangement can be utilized within the instant invention as long as the function of these apertures remain. In other words, a series of beam altering devices, such as lenses or mirrors, may be used in place of apertures 24 and 26.

Figure 2:
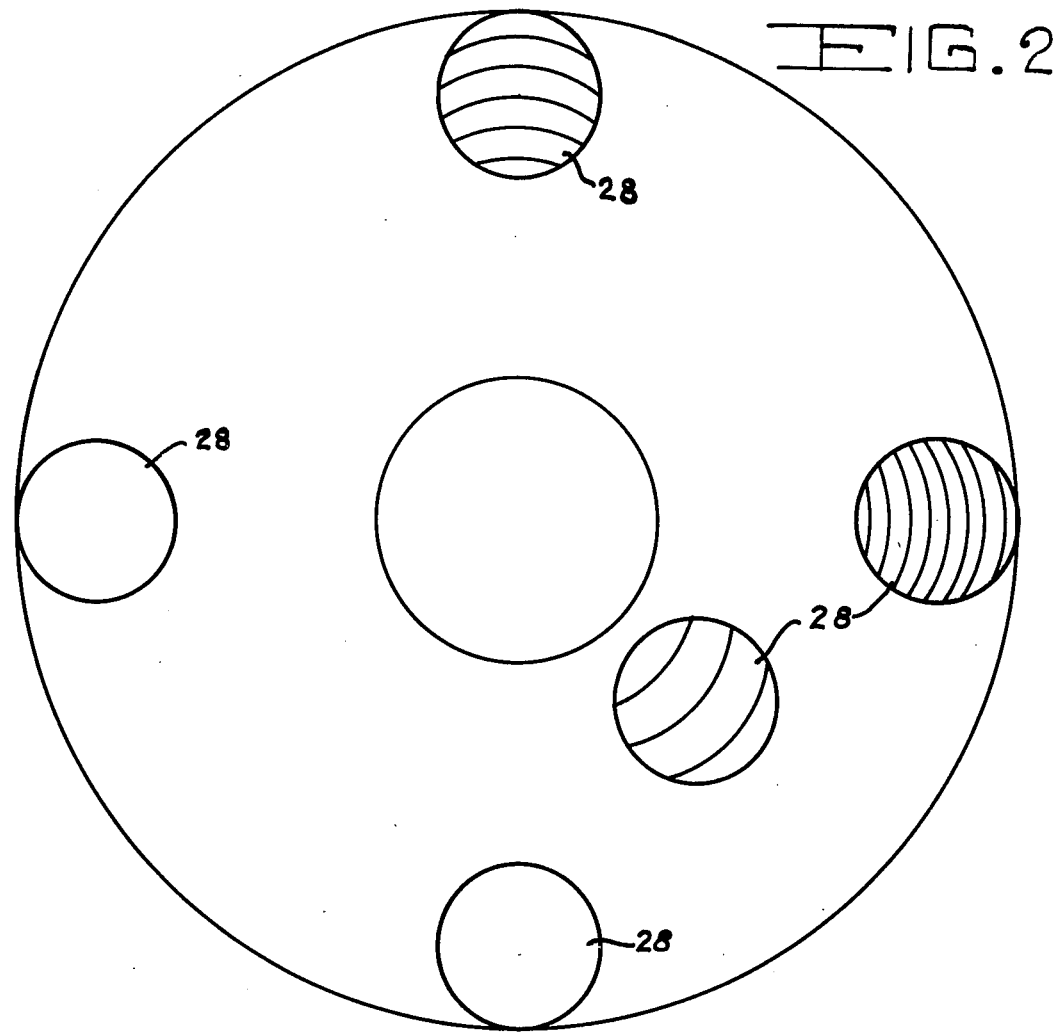
FIG. 2 is a front view of the primary mirror surface of the grating output wavefront sampling system of this invention showing a plurality of the gratings etched therein.

Referring now to FIGS. 1 and 2 of the drawing, it is essential in this invention that a plurality of relatively small, closely spaced reflective, holographic, weak phase gratings 28 ($<\lambda/100$) be formed on primary mirror 18 either by etching or any other conventional procedure. Although only five gratings 28 are shown in FIG. 2, gratings 28 may cover the entire mirror 18. In fact, gratings 28 may overlap each other if desired.

An example of grating physics is given hereinbelow with reference to FIG. 3 of the drawing for a better understanding of the instant invention.

Figure 3:
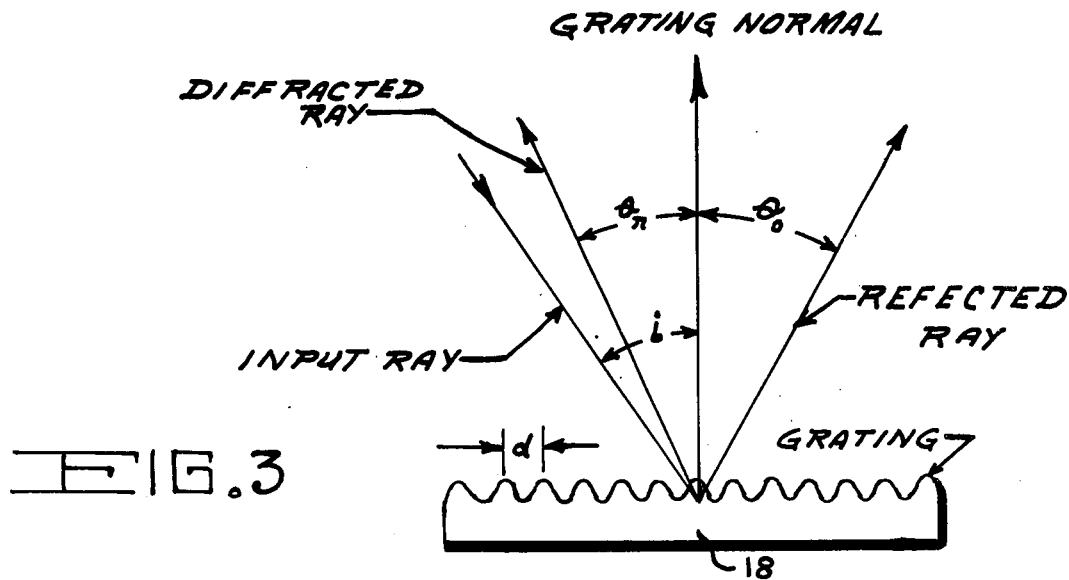
FIG. 3 is a schematic representation of the various rays of light associated with a grating.

Diffraction grating 18, shown schematically in FIG. 3, diffracts light according to the grating equation $$\sin i + \sin \theta_n = \frac{n\lambda}{d} \quad (1)$$

where $i$ and $\theta_n$ are, respectively, the angle of incidence and the $n^{th}$ order diffraction, $\lambda$ is the light wavelength and d is the grating period. In zeroeth order, the usual wavelength independent laws of reflection apply:

$$i = -\theta_o. \quad (2)$$

The variation of the first order diffracted ray with incident ray variation is also wavelength independent:

$$\Delta \theta_1 = -\frac{\cos i}{\cos \theta_1} \Delta i = \frac{\cos \theta_o}{\cos \theta_1} \Delta \theta_o \quad (3)$$

If, as in the proposed geometry of this invention, the diffracted beam 32 is directed nearly back upon itself to secondary mirror 20, i.e., $$i = -\theta_o \approx \theta_1, \text{ then, } \Delta\theta_1 \approx \Delta\theta_o. \quad (4)$$

therefore, to the accuracy of the cosine ratios approximating unity in eq. (3), the angle difference between $\theta_o$ and $\theta_1$ remains a constant over small changes in the angle of incidence on the grating. Therefore, for n=1

$$\sin \theta_1 = \sin \theta_o + \frac{\lambda}{d} \quad (5)$$

But $\theta_o < 0$.

$$\sin \theta_1 + \sin |\theta_o| = \lambda/d, \text{ OR} \quad (6)$$

$$2 \sin \left[ \frac{\theta_1 + |\theta_o|}{2} \right] \cos \left[ \frac{\theta_1 - |\theta_o|}{2} \right] = \frac{\lambda}{d}. \quad (7)$$

During operation of the sampling system 10 of this invention, laser beam 12 is directed through aperture 24 of primary mirror 18 and onto the reflective surface of convex secondary mirror 20. Mirror 20 receives beam 12 and expands or diverges beam 12 as it is directed onto the reflective surface of concave primary mirror 18. Upon beam 12 striking mirror 18, the zeroeth order output 30 of gratings 28 are the projected high energy portion of beam 12 since, in this order, the usual laws of reflection apply. Output 30 is a nominally collimated beam long the optic axis of beam expander 16. Beam 30 is not affected by the presence of gratings 28, its accuracy being solely a function of laser wavefront input, relay optics and the accuracy of the wavefront of beam expander 16.

The first order output 32 of beam 12 of each grating 28 is a portion of output wave 30 tilted and focused onto wavefront sensor 22. The wavefront sensor 22 determines the diffracted ray direction, and, using conventional Hartmann-subaperture tilt analysis infer figure error and boresight tilt relative to an arbitrary axis referenced by primary mirror 18.

As set forth above the diffracted portion of beam 12 (output 32) has a known relationship to the projected portion of beam 12 (output 30). The system 10 of this invention operates very nearly in the littrow configuration in which the diffracted ray (output 32) is directed back on the input beam 12. In such a configuration the angle between the reflected or projected ray 30 and the diffracted ray 32 depends only on $\lambda/d$. Therefore, the direction of the reflected ray 30 may be determined by measurement of the direction of the diffracted ray 32 if $\lambda$ and d are known. Errors in the knowledge of $\lambda$ or d produce an error similar to a focus error.

To summarize, if the wavelength, $\lambda$, and grating spacing, d, are accurately known, knowledge of tilt and wavefront accuracy of the projected beam 30 may be obtained by performing a conventional Hartmann subaperture tilt analysis of the first order diffracted beams from grating sections on primary mirror 18. If, instead, λ (or the centroid of energy distribution around λ) and d are only approximately known but remain constant, then the system 10 of this invention will be able to detect deviations from an "ideal plane" projected beam pattern established during calibrations.

Although this invention has been described with reference to a particular embodiment, it will be understood to those skilled in the art that this invention is capable of a variety of alternate embodiments within the spirit and scope of the appended claims.

I claim:

1. A grating output wavefront sampling system comprising means for providing a quasi-monochromatic beam of light and a beam expander in optical alignment with said quasi-monochromatic beam of light, said beam expander having:

(a) means in optical alignment with said beam of light for diverging and directing said beam of light,
    (b) means in optical alignment with said divergent beam of light for reflecting a portion of said beam of light, the wavefront of said reflected portion of said beam of light having tilt and wavefront accuracy characteristics associated therewith, means on said reflecting means for diffracting another portion of said beam, the wavefront of said diffracted portion of said beam of light having tilt and wavefront accuracy characteristics associated therewith, and
    (c) means in optical alignment with said diffracted portion of said beam of light for sensing said characteristics of said wavefront of said diffracted portion of said beam, said wavefront characteristics of said diffracted portion of said beam of light having a predetermined relationship with respect to said wavefront characteristics of said reflected portion of said beam of light whereby sensing said wavefront characteristics of said diffracted portion of said beam of light provides information about said wavefront characteristics of said reflected portion of said beam of light.

2. A grating output wavefront sampling system as defined in claim 1 wherein said reflecting means is a concave primary mirror and said diverging and directing means is a convex secondary mirror.

3. A grating output wavefront sampling system as defined in claim 1 wherein said diffracting means is in the form of a grating.

4. A grating output wavefront sampling system as defined in claim 3 wherein said reflecting means is a concave primary mirror and said diverging and directing means is a convex secondary mirror.

5. A grating output wavefront sampling system as defined in claim 4 wherein said secondary mirror has an aperture therein, said aperture allowing said diffracted portion of said beam of light to pass therethrough and said sensing means being located adjacent said aperture.

6. A grating output wavefront sampling system as defined in claim 5 wherein said primary mirror has an aperture therein, said aperture being optically aligned with said means for providing said quasi-monochromatic beam of light thereby allowing said beam of light to pass therethrough.

7. A grating output wavefront sampling system as defined in claim 1 wherein said diffracting means is in the form of a plurality of different gratings.

8. A grating output wavefront sampling system as defined in claim 7 wherein said reflecting means is a concave primary mirror and said diverging and directing means is a convex secondary mirror.

9. A grating output wavefront sampling system as defined in claim 8 wherein said secondary mirror has an aperture therein, said aperture allowing said diffracted portion of said beam of light to pass therethrough and said sensing means being located adjacent said aperture.

10. A grating output wavefront sampling system as defined in claim 9 wherein said primary mirror has an aperture therein, said aperture being optically aligned with said means for providing said quasi-monochromatic beam of light thereby allowing said beam of light to pass therethrough.

* * * * *